United States Patent [19]
Dunegan

[11] Patent Number: 4,457,517
[45] Date of Patent: Jul. 3, 1984

[54] PIPE FLANGE PROTECTOR WITH ELASTOMERIC SELF-CENTERING RIB

[75] Inventor: Ronald G. Dunegan, Katy, Tex.

[73] Assignee: Rodun Development Corporation, Houston, Tex.

[21] Appl. No.: 515,989

[22] Filed: Jul. 22, 1983

[51] Int. Cl.³ .................. F16J 15/12; F16J 15/32; F16L 11/12
[52] U.S. Cl. .................. 277/12; 277/59; 277/152; 277/101; 277/70; 285/45; 285/93; 285/94; 285/336
[58] Field of Search .............. 277/1, 3, 27, 34, 34.3, 277/34.6, 59, 70, 71, 72 R, 72 FM, 74-76, 152, 153, 226, 12, 32, 101; 285/15, 45, 93, 94, 336, 363

[56] References Cited

U.S. PATENT DOCUMENTS

| | | | |
|---|---|---|---|
| 2,271,549 | 2/1942 | Henderson | 285/1 |
| 2,533,868 | 12/1950 | Anderson | 285/109 |
| 2,699,344 | 1/1955 | Bissell | 285/15 |
| 3,246,916 | 4/1966 | Hansen | 285/45 |
| 3,398,977 | 8/1968 | Yoneda | 285/45 |
| 3,603,616 | 9/1971 | Smith | 285/15 |
| 3,770,301 | 11/1973 | Adams | 285/15 |
| 4,049,296 | 9/1977 | Harrison | 285/15 |

FOREIGN PATENT DOCUMENTS 64150 11/1982 European Pat. Off. .............. 285/15

Primary Examiner—Robert S. Ward
Attorney, Agent, or Firm—Carwell & Helmreich

[57] ABSTRACT

An improved flange protector for sealingly engaging spaced flanges and protecting the flange gasket from the environment. A ring-shaped elastomer body preferably includes a grease fitting for injecting the protective fluid through the body and into engagement with the flange gasket. The elastomer body includes a self-centering rib, and is structured for flexing to relieve excessive pressure in the event of flange gasket failure. An improved method of manufacturing flange gaskets according to the present invention is also provided.

15 Claims, 3 Drawing Figures

PIPE FLANGE PROTECTOR WITH ELASTOMERIC SELF-CENTERING RIB

BACKGROUND OF THE INVENTION

The present invention relates to a flange protector adapted to be placed on a flanged joint to protect the flange gasket as well as the flange bolts and interior flange surfaces from the environment.

Flanged type fittings are common in various piping related industries, such as the chemical and petroleum recovery industries. Such fittings include a sealing ring or gasket interposed between a pair of flanges, with connecting flange bolts holding the flanges together and forming a seal between the flanges and the flange gasket. In many applications, the flange bolts are torqued to a desired extent to form the proper seal, with the flange interior surfaces being spaced slightly apart. Such spacing is desirable in order to insure that the two flange surfaces can vary within normal manufacturing tolerances, yet do not engage to limit the force exerted on the seal between the flanges.

It may be understood that air may enter the space between the flanges and corrode the sealing ring, the flange bolt, and the interior of the flange faces. In many applications, such corrosion is not a serious problem and a flange protector of one type or another may not be required. In corrosive environments, however, such as salt water or sour gas environments, such corrosion can be severe and may cause major repair problems. Corrosion of the metallic sealing gasket may cause a massive leak in the pipeline, and corrosion of the interior flange surfaces and the flange bolts can similarly cause both significant expense for repair of the damaged equipment and the loss of production for such repair operations.

The flange protector of the present invention is distinguishable from leak repair devices which temporarily stop leakage from a flange. A flange protector is installed to reduce or prevent flange and seal deterioration and thus prevent leakage, but is not intended to withstand pipeline pressure if the flange gasket leaks. Leak repair clamps, such as those described in U.S. Pat. Nos. 3,603,616 and 4,049,246, are more massive assemblies intended to reduce or eliminate leakage from a flange which otherwise would leak. Because such repair assemblies are intended to withstand high pipeline fluid pressure, the bodies are generally constructed from metallic castings.

The prior art also includes devices intended to serve the dual purpose of a flange protector and a stabilizer between the flanges, such as the device described and claimed in U.S. Pat. No. 3,246,916. The device described therein is capable of resisting substantial lateral forces which may be imposed upon the device by the flange. According to the specification in the patent, however, the device may also be constructed from moldable plastics if the protector is only used to seal the outer peripheries of the flanges. The prior art also includes a pressurized seal device as described in U.S. Pat. No. 2,533,868, which eliminates conventional flange gaskets for flanged pipe sections.

Present day prior art flange protectors are generally of the type described in U.S. Pat. No. 2,271,549. Such flange protectors are intended to protect the sealing ring or flange gasket from the environment, and in part such protection is accomplished by injecting a protective lubricant through the flange protector and into contact with the seal.

Prior art flange protectors of the latter type also have several significant drawbacks. First, these flange protectors can create a severe safety hazard if the flange gasket or seal leaks. In that event, the pipeline pressure subjects the metal outer band of the gasket to high forces, which may cause the metal band to break apart, thus hurling the protector at a high speed toward personnel or other equipment. In part due to the safety hazards associated with flange protectors of the type described in U.S. Pat. No. 2,271,549, such devices have not been widely accepted in industry. Moreover, such prior art flange protectors frequently do not function to maintain the protective fluid under pressure for extended periods of time. Finally, such prior art flange protectors are not easily installed on a flange, and are difficult to install and reuse on other flanges since the metal band frequently becomes bent to the extent that the inner rubber band no longer seals against the flange surfaces.

SUMMARY OF THE INVENTION

An improved flange protector is provided for sealing protecting a flange gasket interposed between a pair of spaced flanges from the environment. The flange protector comprises an elongate body having a pair of tapered end surfaces for forming a ring-shaped member in sealing engagement with the spaced apart flanges. Valve means are provided for injecting a protective fluid through the elastomer body and into engagement with the flange gasket, and maintaining the protective fluid under pressure. The elastomer body has a cross-sectional configuration for independently withstanding the maximum anticipated pressure of the protective fluid while maintaining the body in sealing engagement with the spaced apart flanges. In the event that the flange gasket leaks, the elastomer body stretches to safely release excessive pressure without causing significant stress in any outer metal hoop member. Improved methods are also provided for manufacturing the flange gasket according to the present invention.

Accordingly, it is a primary feature of the present invention to provide a flange gasket having an elongate elastomer body for relieving excessive pressure in the event of primary flange gasket failure.

It is a further feature of the present invention to provide an improved flange protector of the type including means for injecting a protective lubricant under pressure into engagement with the flange gasket and maintaining such protective lubricant under pressure for extended time periods.

It is still a further feature of the present invention to provide improved methods for protecting a flange gasket from a corrosive environment while relieving excessive pressure in the event of flange gasket failure.

It is another of the present invention to provide improved methods for manufacturing a flange gasket according to the present invention.

It is a further feature of the present invention to provide an improved flange gasket which can be more quickly and easily installed on a flange.

Still another feature of the present invention is to provide an improved flange gasket which can be more readily removed from one flange and properly reinstalled on another flange.

These and other features, objects, and advantages of the present invention will become from the following detailed description, wherein reference is made to the Figures in the accompanying drawings:

DETAILED DESCRIPTION OF THE INVENTION

The protector of the present invention has utility with pressure connections including sealing means interposed between spaced flanges. Such flanges are commonly used in the petroleum recovery, refining, and chemical industries, and are therefore only generally described herein. Typical conduits with such flange assemblies are shown, for example, in U.S. Pat. Nos. 4,049,296 and 3,246,916, which are incorporated herein by reference.

Figure 1:
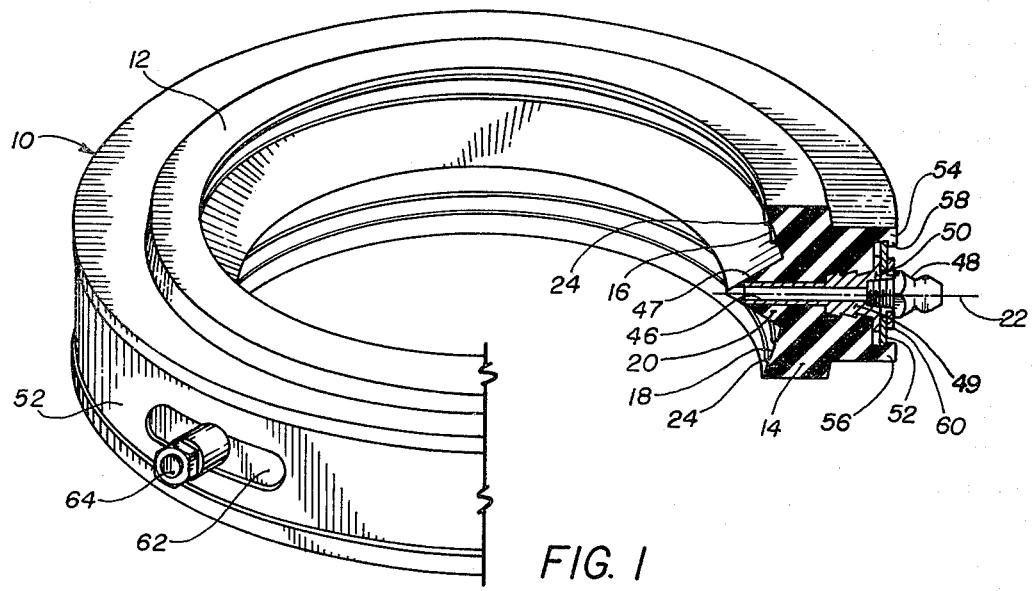
FIG. 1 is a pictorial representation, partially in cross-section, of a flange protector according to the present invention.

Referring now to FIG. 1, a typical flange protector 10 is shown in a ring-shaped configuration, with a portion of the flange protector removed for clarity. It should be understood that the main body 12 is manufactured from an elastomer, such as rubber. When not assembled, the main body has an elongate configuration, so that the body may be stored and shipped in an elongate carton having a rectangular cross-section only slightly larger than the cross-section of the body 12. Each protector is manufactured for a particular size flange, and therefore the diameter of the intended flange determines the length of the elastomer body. The flange protector when assembled about a flange is shaped in a ring-shaped configuration, and therefore the assembled flange protector will have a configuration similar to the protector shown in FIG. 2 of U.S. Pat. No. 2,271,549.

In cross-section, the elastomer body 12 includes an upper body portion 14 having a pair of inner surfaces 16 and 18 designed to engage the outer surface of the circular flange body, and a generally V-shaped lower rib 20 intended to fill a portion of the space between the flanges. The main body 12 may be symmetrical about center line 22.

As initially formed, each surface 16 and 18 has a slight downward taper moving outwardly from center line 22, with downward being defined parallel to centerline 22 and in the direction of the apex of V-shaped rib 20. An acute angle of between 10° and 30°, and preferably approximately 20°, exists between each surface 16 and 18 and a line perpendicular to center line 22. When installed on a flange, however, the inner surfaces 16 and 18 may be deformed so that each surface is generally perpendicular to the center line 22 and is therefore generally parallel to the outer periphery of the flange. Also, each surface 16 and 18 may be provided with one or more small V-shaped ribs 24, which preferably are provided along the length of the elongate body. If ribs 24 are provided, they may engage the outer periphery of the flange when the protector is installed, so that the surface 16 or 18 does not itself engage the flange but is still parallel with the outer periphery of the flange.

The V-shaped rib is intended for forming the primary sealing engagement with the flange, and each tapered surface 47 intended for sealing engagement with the flange is preferably formed at an angle of between 20° and 40°, and preferably approximately 30°, from the centerline 22. The rib 20 serves to center the protector on the flange, and acts as a stop so that the protector will not laterally slip on the flange either when installed or subsequent to installation.

As explained subsequently, the flange protector of the present invention preferably includes means for injecting a protective lubricant through the installed flange protector and into engagement with the flange gasket, and maintaining the protective fluid under pressure. As shown in FIG. 1, a small tube 46 may be pushed through the upper portion 14 and V-rib 20, and may be connected to or otherwise be placed in fluid communication with retaining plug 49. The plug 49 may have a plurality of barbs which secure the plug in a fixed position within the elastomer body, and may also have an upper retaining member 50 for engagement with the outer surface of upper body 14. A grease fitting 48 may then be threaded or otherwise mounted to plug 49 and thus be in fluid communication with the tube 46. Grease or other protective lubricant may therefore be injected through the grease fitting 48, pass through the plug 49 and the tube 46, and thus come into engagement with the sealing gasket to protect the gasket from the environment.

Figure 2:
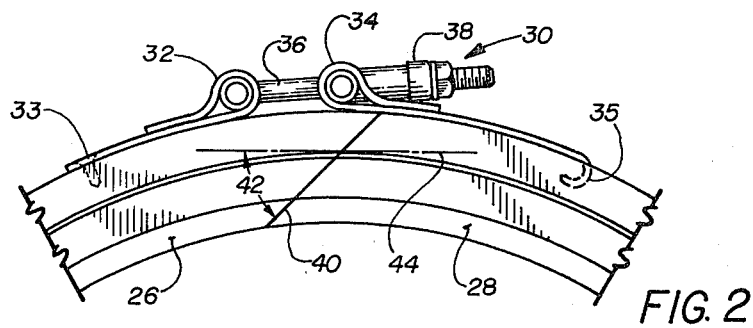
FIG. 2 is a side view of a portion of a flange protector including locking means for securing together the ends of the elongate body.

Referring now to FIG. 2, it may be seen that the two ends 26 and 28 of the elongate body 12 are joined together by a suitable locking means 30 to complete the ring-shaped configuration. Locking means 30 may comprise a pair of metal straps 32 and 34 each having its ends secured to the respective ends 26 and 28 of the elongate body 12. Metal straps 32 and 34 may then be joined together by a threaded bolt 36 and nut member 38, each respectively pivotally secured to its respective metal strap. Each of the metal straps 32 and 34 may be secured by any convenient means to the ends 26 and 28. The strap 32 may be riveted to the top surface of the elongate body (typical rivets being depicted at 33), while the strap 34 includes a hook-shape portion 35 which is embedded into the body. Staples, screws, adhesives or other conventional securing means may also be used to secure each end of the latching mechanisms to the respective end of the elastomer body.

Each of the end surfaces of the elongate body are preferably tapered, and when joined together as shown in FIG. 2, the tapered is matched at seam 40 so that the cross-sectional configuration in the area of seam 40 is similar or identical to the cross-sectional configuration of the rest of the elongate body. The end surfaces are tapered to increase the sealing efficiency of the elongate body with the spaced flanges in the area of the seam 40. If the elongate body 12 is laid out on a horizontal surface with the V-shaped rib 20 along the length of the body pointing downward along a substantially straight line, each of the ends are tapered at an angle of between 30° and 60°, and preferably approximately 45°, to the horizontal plane. Stated differently, the angle 42 of the seam 40 is between 30° and 60°, and preferably approximately 45°, to a line 44 tangent to the assembled flange protector and passing through the seam 40.

As explained in further detail below, the material and the cross-sectional configuration of a flange protector are sufficient to independently withstand the pressure of the injected fluid and maintain that fluid under pressure by maintaining sealing engagement between the flange protector and the flange. Rather than use the latching means shown in FIG. 2, it may be easier to provide a thin metal strap 52 as shown in FIG. 1, which would encompass the outer periphery of the elastomer body 12. Such a strapping could, of course, then be provided with ends similar to that shown in FIG. 2. Such a metal strap could be much more flexible than the strap shown in FIG. 2 of U.S. Pat. No. 2,271,549, for reasons explained below, but may have the general ring-shaped configuration depicted in that Figure.

If the metal strap 52 is utilized, the upper portion of the elastomer body may be provided with raised guides 54 and 56 intended to prevent the metal strap 52 from shifting off the elastomer body when the protector is installed. Also, each of the guides may be provided with projection 58 so that the space between the projections 58 is less than the width of the strap 52, so that the strap 52 is held on the body prior to installation. As shown in FIG. 1, a spacer washer 60 may be provided between the fitting 48 and the projections 58, which also assists in securing the grease fitting 48 into position.

Since the metal strap 52 moves relative to the elastomer body as a latching mechanism is tightened, the metal strap 52 may be provided with an elongate aperture in the area of the grease fitting. A similar slot 62 may be provided in the area of relief valve 64 shown in FIG. 1, which may also be mounted on the elastomer body in a manner similar to the grease fitting. The relief valve 64 is intended to relieve protective fluid pressure after the flange protector has been installed and filled to the desired pressure with a protective fluid. Thus, the relief valve 64 may also be provided with a tube similar to tube 46 so that the relief valve is in fluid communication with the protective fluid. Fluid may thus be injected into contact with the seal with the aid of grease fitting 48, and relief valve 64 may be set at the desired pressure, normally between 5 psi and 35 psi, so that the relief valve would open to expel protective fluid once the desired pressure has been obtained.

Figure 3:
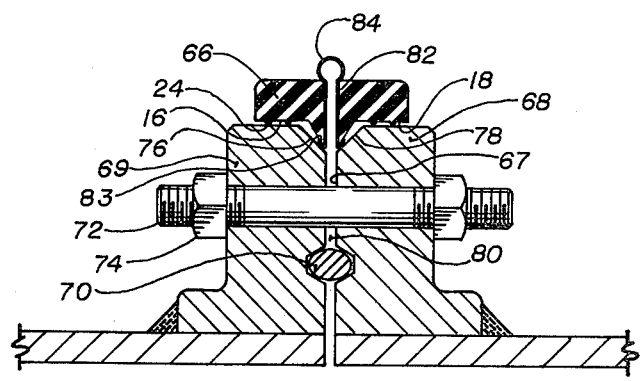
FIG. 3 is a cross-sectional view of a flange protector installed on a typical flange.

If a latching mechanism similar to that depicted in FIG. 2 is utilized, the upper body portion 66 of the elongated body may have a cross-sectional configuration similar to that depicted in FIG. 3 when installed on a flange. The upper body portion 66 includes inner surfaces 16 and 18, as well as a plurality of small ribs 24, for engagement with the outer periphery of the flange members 66 and 68. A sealing ring or flange gasket 70 is interposed between the flange members, which are joined by a plurality of flange bolts 72 and nuts 74. When the flange protector of the present invention is installed, the V-shape rib 20 forms a primary seal with the ends of the flanges by engaging the surfaces 76 and 78, which are normally tapered. Either the inner surfaces 16 and 18 or the ribs 24 are preferably in engagement with the outer periphery of the flanges, and form a secondary seal. Once installed, the protective fluid may be injected through the flange body by utilizing grease fitting 48, and the protective fluid will be maintained under pressure within the cavity 80 formed between the spaced flanges 68 and 64, the flange gasket 70 and the flange protector. Thus, the flange gasket of the present invention protects the flange gasket, the flange bolts (in the space between the spaced flanges), and the flange faces 67 from the environment.

FIG. 3 also illustrates an expandable bladder member 82 which may be used in conjunction with the present invention. The bladder 82 may be provided at any convenient location along the length of the elongate body, and if the strap 52 is utilized, an appropriate slot in the strap may also be provided. The bladder 82 includes an elongate body which may be fitted within a tube-shaped aperture similar to tube 46 (not depicted), and a ball-shaped upper portion 84 positioned at the outer end of the elongate body. The lower end of the bladder 83 may be sealed against the V-shaped rib 20 by gluing or other means. The bladder 82 preferably is manufactured from a pliable member and has a thin wall, so that when the aperture 80 is filled with a protective fluid, the ball member 84 expands due to fluid pressure. Bladder 82 may thus serve as a visual indicator of the pressure level maintained within the aperture 80, so that one could readily detect a loss of fluid pressure.

An advantage of the present invention compared to prior art flange protectors is that the elastomer body of the flange protector independently withstands the maximum anticipated protective fluid pressure, yet is sufficiently elastic to be self relieving by allowing the primary and secondary seals to break with the flange to release pressure in the event of flange gasket failure. Regardless of the degree of environmental protection provided by the flange protector, it is always possible for the flange gasket to leak, so that the flange protector would thus be subjected to pipeline pressure of possibly 150 psi or greater.

Prior art flange protectors of the type shown in U.S. Pat. No. 2,271,549 do not adequately relieve this increased pressure, and thus the outer metallic band of such a flange protector is subjected to higher forces and may shear. If the metal outer band fails, the protector may be hurled at high speed and injure nearby personnel and equipment.

The combination flange protector and stabilizer shown in U.S. Pat. No. 3,246,916 is of a much sturdier construction than the described in the '549 patent, so that this device might withstand a higher pressure in the event of primary gasket failure. This, however, does not eliminate the safety risk associated with this device, since the device can also fail if subjected to a sufficiently high pressure, and failure at that higher pressure in combination with the more massive assembly only increases the safety hazard. This device, like the massive leak repair devices described earlier, thus continues to present a significant safety hazard in the event of primary flange gasket failure, and such devices have not been widely accepted in the industry.

Applicant's invention, on the other hand, teaches away from the concept of providing a more massive protector, and instead teaches that a flange protector should be fabricated of an elastomer material which will flex to break the seal with the flange in the event of primary gasket failure. As described above, Applicant's product does not require an outer non-elastomer band to withstand the maximum anticipated protective fluid pressure, and thus all or a substantial portion of the length of Applicant's elongate body need not have an outer metal band to be capable of withstanding such pressure. If a metal band is provided along the length of Applicant's device for ease of joining the end sections, the metal band may be very thin since it is provided to give sufficient hoop strength to keep the elastic body in a ring-shape configuration and in sealing engagement with the flange, and is not necessary to provide the elastomer body with sufficient cross-sectional strength to independently withstand the maximum anticipated protective fluid pressure. Thus, although in one embodiment of Applicant's invention a metal band is provided, this does not detract from the safety feature of Applicant's invention. In such an embodiment, the metal band may be subjected to a slightly higher force in the event of primary gasket failure. Since the elongate body is independently capable of resisting the maximum anticipated protective fluid pressure, however, the elastic body may also be structured to relieve pressure if such maximum protective fluid pressure is exceeded by any significant amount, e.g., in excess of 40 psi over the maximum anticipated protective fluid pressure. In any case, therefore, the outer metal band of this embodiment of Applicant's invention will not be subjected to any significant increase in tension in the event of primary gasket failure, regardless of the pipeline pressure.

It is a feature of Applicant's invention to provide a relief valve on the flange protector in fluid communication with the aperture 80 for automatically relieving protective fluid pressure. The maximum anticipated protective fluid pressure would therefore be governed by the setting on the relief valve 64. Under normal operating conditions, it is preferable to maintain some positive pressure, generally in the range of 5 psi to 35 psi within the aperture 80. Grease may therefore be injected through the fitting 48, and the release of grease through the valve 64 would signify that the desired maximum protective fluid pressure had been obtained. If desired, the relative size of the ball member 84 may be observed, and the subsequent decrease in the size of the flexible ball 84 would therefore signify a loss of protective fluid pressure. In any event, additional protective fluid may be periodically injected through fitting 48, and excessive fluid pressure may be automatically relieved through valve 64.

Assuming the relief valve 64 were set at 25 psi, the maximum anticipated protective fluid pressure would also be 25 psi. In the event of flange gasket failure, the flange protector of the present invention would function to release excessive pressure that has been subjected to the protective fluid. If the pipeline were operating under a relatively low pressure, e.g., 150 psi, the pipeline fluid which bypassed the seal 70 may be released through the relief valve 64. In this case, it is possible that the highest pressure achieved in the aperture 80 may be, e.g., 50 psi. If, on the other hand, the pipeline were operating under a higher pressure of 1000 psi or the seal 70 were to rupture rather than leak, the volume of additional fluid entering the aperture 80 may be greater than the volume of fluid that may normally be expelled through the relief valve 64, so that in the latter case the pressure in the aperture 80 may increase over 50 psi. In the latter case, the elastomer material of Applicant's invention and the cross-sectional configuration of the body are selected so that the body will intentionally flex to relieve any pressure greater than, e.g., 60 psi. Thus, even if the relief valve were to fail, or would not be capable of relieving a sufficient volume to maintain fluid pressure at the 50 psi level, the flange protector would flex to relieve pressure in excess of 50 psi and thus would not create a safety hazard.

As explained above, the preselected maximum anticipated protective fluid pressure ($P_1$), which may be set by adjustment to the relief valve, will generally be in the range of 5 psi to 35 psi. The elastomer body of the present invention is selected for automatically deforming to break the sealing engagement with the spaced flanges to relieve excessive pressure of any magnitude ($P_2$) substantially in excess of this maximum anticipated pressure. The material and cross-sectional configuration of the elastomer body should thus be generally selected to break its seal with the spaced flanges when $P_2$ is in excess of 100 psi (or less) over $P_1$. Preferably, the elasticity of the elastomer body and the cross-sectional configuration of the body are selected so that this sealing function will be broken when $P_2$ in the range of 20 psi to 60 psi greater than $P_1$. Stated differently, the cross-sectional configuration and elasticity of the elastomer body may be selected so that the pressure in the aperture 80 will not obtain a magnitude in excess of a preselected maximum allowable pressure, and this maximum allowable pressure is not substantially in excess of the maximum anticipated pressure, so that the flange protector does not present a safety hazard to personnel or equipment.

Being manufactured from rubber or other elastomer, the flange protector body of the present invention is not electrically conductive. In addition, the device would be less likely to become damaged when removed from one flange or reinstallation on another flange than prior art devices. In prior art protectors the outer metal bond may become bent, or the sealing surface of the more massive assembly is shown in U.S. Pat. No. 3,246,916 may become nicked, so that the device would no longer provide a sufficient seal when reinstalled on another flange. Accordingly, such prior art devices are often used in only a single application and are not removed and reinstalled on other flanges. The elastomer body of Applicant's design is sufficiently flexible, however, that it may be repeatedly installed, removed and reinstalled on another flange.

The elongate body 12 of Applicant's invention is preferably fabricated from natural or synthetic rubber having a durometer range of 50° to 75° on the A scale, and preferably in the range of 55° to 65° on the A scale. It has been found that this range provides the desired elasticity of a flange protector which may maintain a long-lasting seal with the flange under the maximum anticipated protective fluid pressure, yet also flex so that the flange protector seal may be broken in the event of primary flange failure.

The cross-sectional configuration of the elastomer body along at least a substantial length of the flange protector is selected for independently withstanding the maximum anticipated protective fluid pressure. This feature is, of course, a function of both the selected material for the elastomer body and the cross-sectional configuration. The selected cross-sectional configuration is, however, distinct from the inner strip material in U.S. Pat. No. 2,271,549, since such strip material is not intended to independently withstand the maximum anticipated protective fluid pressure. For a material having an elasticity in the range recited above the cross-sectional area of the elastomer body may be in the range of 0.5 square inches to 3.0 square inches, and preferably in the range of 0.8 square inches to 1.8 square inches.

Applicant has also provided an improved method of manufacturing a flange protector according to the present invention. The elongate elastomer body preferably has a uniform cross-sectional configuration, and may thus be easily formed by an extrusion process. The material and cross-sectional configuration of the body are selected so that the body may independently withstand or oppose all of the forces being subjected on the body by the maximum anticipated protective fluid pressure, so as to maintain the elastomer body in sealing engagement with the flange. The material and cross-sectional configuration of the elastomer body are also selected, however, to provide for sufficient deformation of the body to break the seal with the flange and relieve excessive pressure in the event the flange protector is subjected to a pressure significantly higher than the maximum anticipated protective fluid pressure.

Once an elongate body has been manufactured according to the above techniques, a latching mechanism is provided for maintaining the body in a ring-shaped configuration when the ends of the body are brought into engagement and the body is placed about the flange. In addition, valve means may be provided on the body for injecting protective fluid through the body and retaining the fluid under pressure, and relief valve means may also be provided on the body for automatically relieving pressure in excess of the maximum anticipated protective fluid pressure.

The term "flange gasket" as used herein is intended to mean any type of gasket or sealing ring, whether partially metallic or otherwise, used to seal spaced pipeline flanges. The term "elastomer" as used herein is a polymer which exhibits elasticity and other rubber-like properties. For ease of explanation, the configuration of the elastomer body is referred to as elongate, since the body may be easily extruded in the manufacturing process and may be easily cut to the desired length. In cross-section as shown in FIG. 3, the configuration of various features is described by referencing the apex of the V-shaped rib as pivoting downward. The term "downward" is used, however, only for orientation purposes in describing the configuration of the elongate body and its mounted relationship to standard spaced apart flanges.

Numerous variations and modifications may be made in the method apparatus described herein without departing from the present invention. Accordingly, it should be clearly understood that the forms of the invention described herein and shown in the Figures of the accompanying drawings are illustrative only and are not intended to limit the scope of the invention.

What is claimed is:

1. A flange protector for sealing protecting a flange gasket interposed between a pair of spaced flanges from the environment with a protective fluid, comprising:
   an elongate elastomer body having a pair of tapered end surfaces and adapted for forming a ring-shaped member for sealing engagement with each of said spaced flanges;
   said elastomer body having a selected cross-sectional configuration throughout at least a substantial length of said elastomer body for independently withstanding the maximum anticipated pressure of said protective fluid and maintaining said elastomer body in sealing engagement with each of said spaced flanges;
   latching means for securing together said tapered end surfaces when said body is placed about said pair of spaced flanges;
   valve means for passing said protective fluid through said elastomer body and into engagement with said flange gasket and maintaining said protective fluid under pressure; and
   relief valve means for automatically relieving protective fluid pressure in excess of said maximum anticipated pressure.

2. A flange protector as defined in claim 1, wherein each of said end surfaces is tapered at an angle of approximately 45° with respect to a line tangent to said elastomer body when formed to a ring-shaped configuration and passing through said tapered surfaces.

3. A flange protector as defined in claim 1, wherein said elastomer body is manufactured from rubber having a durometer range of from 50° to 75° on the A scale.

4. A flange protector as defined in claim 1, said elongate elastomer body having a uniform cross-sectional configuration throughout its length.

5. A flange protector as defined in claim 1, further comprising pressure indicating means in fluid communication with said protective fluid for providing a visual indication of said protective fluid pressure.

6. A flange protector as provided in claim 1, said elastomer body having a selected cross-sectional configuration throughout at least a substantial length of said elastomer body for deforming to break said seal with said pair of spaced flanges and relieving pressure of any magnitude substantially in excess of said maximum anticipated protective fluid pressure.

7. A flange protector as defined in claim 1, wherein said elastomer body includes a V-shaped rib for fitting engagement between said spaced flanges and forming a primary seal for maintaining said protective fluid under pressure within said flange protector.

8. A flange protector as defined in claim 7, wherein said elastomer body includes a pair of generally tapered inner surfaces adapted for engagement with the outer periphery of said spaced flanges and each initially formed at an angle of between 10° and 30° with respect a line pependicular to the center line of said V-shaped rib.

9. A flange protector as defined in claim 8, further comprising:
   a raised sealing member positioned on each of said tapered inner surfaces and formed along the length of said elastomer body for forming a secondary seal for maintaining said protective fluid under pressure within said flange protector.

10. A flange protector for sealingly protecting a flange gasket interposed between a pair of spaced flanges from the environment with a protective fluid at a pressure level no greater than a maximum anticipated pressure, comprising:
    an elongate elastomer body for forming a ring-shaped member in sealing engagement with each of said spaced flanges;
    said elongate elastomer body having tapered surfaces at each end;
    latching means for securing together said tapered surfaces;
    valve means for introducing said protective fluid through said elastomer body and maintaining said protective fluid under said maximum anticipated protective fluid pressure;
    said elastomer body having a selected cross-sectional configuration throughout at least a substantial length of said elastomer body for independently withstanding the maximum anticipated pressure of said protective fluid and maintaining said elastomer body in sealing engagement with each of said spaced flanges; and
    said elastomer body having a selected elasticity for deforming to break said sealing engagement with said pair of spaced flanges to relieve pressure of any magnitude substantially in excess of said maximum anticipated pressure.

11. A flange protector as defined in claim 10, wherein each of said end surfaces is tapered at an angle of approximately 45° with respect to a line passing through said tapered surfaces and tangent to said elastomer body when formed in said ring-shaped configuration.

12. A flange protector as defined in claim 10, wherein said elastomer body is manufactured from rubber having a durometer range of from 50° to 75° on the A scale.

13. A flange protector as defined in claim 10, said elongate elastomer body having a uniform cross-sectional configuration throughout its length.

14. A flange protector as provided in claim 10, further comprising relief valve means positioned on said elastomer body for relieving protective fluid pressure in excess of said maximum anticipated pressure.

15. A flange protector as defined in claim 10, wherein said elastomer body includes a V-shaped rib for fitting engagement between said spaced flanges and forming a primary seal for maintaining said protective fluid under pressure within said flange protector.

* * * * *